US011325164B2

(12) United States Patent
Hirata et al.

(10) Patent No.: US 11,325,164 B2
(45) Date of Patent: May 10, 2022

(54) MACHINING SWARF REMOVING APPARATUS

(71) Applicant: HONDA MOTOR CO., LTD., Tokyo (JP)

(72) Inventors: Yuichi Hirata, Tochigi (JP); Shinji Ago, Tochigi (JP); Takanori Sato, Tochigi (JP); Yuki Sato, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 501 days.

(21) Appl. No.: 16/080,185

(22) PCT Filed: Dec. 28, 2016

(86) PCT No.: PCT/JP2016/089056
§ 371 (c)(1),
(2) Date: Aug. 27, 2018

(87) PCT Pub. No.: WO2017/158995
PCT Pub. Date: Sep. 21, 2017

(65) Prior Publication Data
US 2019/0054505 A1 Feb. 21, 2019

(30) Foreign Application Priority Data

Mar. 18, 2016 (JP) .............................. JP2016-055348

(51) Int. Cl.
*B08B 1/00* (2006.01)
*B23K 26/16* (2006.01)
(Continued)

(52) U.S. Cl.
CPC .............. *B08B 1/002* (2013.01); *B08B 1/008* (2013.01); *B08B 9/00* (2013.01); *B23K 26/0838* (2013.01);
(Continued)

(58) Field of Classification Search
CPC ......... B08B 1/002; B08B 9/00; B24B 27/033; B24B 429/005; B24B 27/04
(Continued)

(56) References Cited

U.S. PATENT DOCUMENTS 3,388,504 A * 6/1968 Day ................... B23Q 11/0042
451/283
9,145,112 B1 * 9/2015 Ihde ................... A46B 15/0081

FOREIGN PATENT DOCUMENTS

CA 2307701 A1 * 11/2000 ........... A46B 5/0075
CN 104858466 A * 8/2015 ............... B21H 3/06
(Continued)

*Primary Examiner* — Joseph J Hail
*Assistant Examiner* — Jonathan R Zaworski
(74) *Attorney, Agent, or Firm* — Carrier Blackman & Associates, P.C.; Joseph P. Carrier; Anne G. Sabourin

(57) ABSTRACT

A machining swarf removing apparatus includes a left and a right machining swarf removing units. When removing machining swarf adhered to a recovery box, the left machining swarf removing unit is placed in removal starting position. A brush enters an insertion-ready state in which transverse direction thereof is oriented in a second direction D2. The brush is moved to an insertion position for insertion into the recovery box, then the brush is rotated to enter a machining swarf removal-ready state in which a longitudinal direction thereof is oriented in the second direction D2. The left machining swarf removing unit is moved to remove the machining swarf adhered to the recovery box by the brush, while a left rod vibrating device is driven to vibrate a rod, vibrating the brush attached to the rod.

3 Claims, 11 Drawing Sheets

(51) Int. Cl.
    *B08B 9/00*     (2006.01)
    *B23K 26/70*     (2014.01)
    *B23Q 11/00*     (2006.01)
    *B23K 26/38*     (2014.01)
    *B23K 26/08*     (2014.01)
    *B23K 101/18*     (2006.01)
    *B23K 103/04*     (2006.01)

(52) U.S. Cl.
    CPC .............. *B23K 26/16* (2013.01); *B23K 26/38* (2013.01); *B23K 26/70* (2015.10); *B23K 26/702* (2015.10); *B23Q 11/0053* (2013.01); *B23K 2101/18* (2018.08); *B23K 2103/04* (2018.08)

(58) Field of Classification Search
    USPC ..... 15/21.1, 54, 55, 56, 88.4, 88.1; 451/313, 451/319, 508, 552, 553, 916
    See application file for complete search history.

(56) References Cited

FOREIGN PATENT DOCUMENTS

| | | | | |
|---|---|---|---|---|
| JP | H11270216 A | * | 3/1998 | |
| JP | 10-151719 A | | 6/1998 | |
| JP | 2004-209534 A | | 7/2004 | |
| JP | 5668679 B2 | * | 12/2011 | |
| JP | 2016-034650 A | | 3/2016 | |
| WO | WO-2006018165 A1 | * | 2/2006 | ............... B21H 3/06 |

* cited by examiner

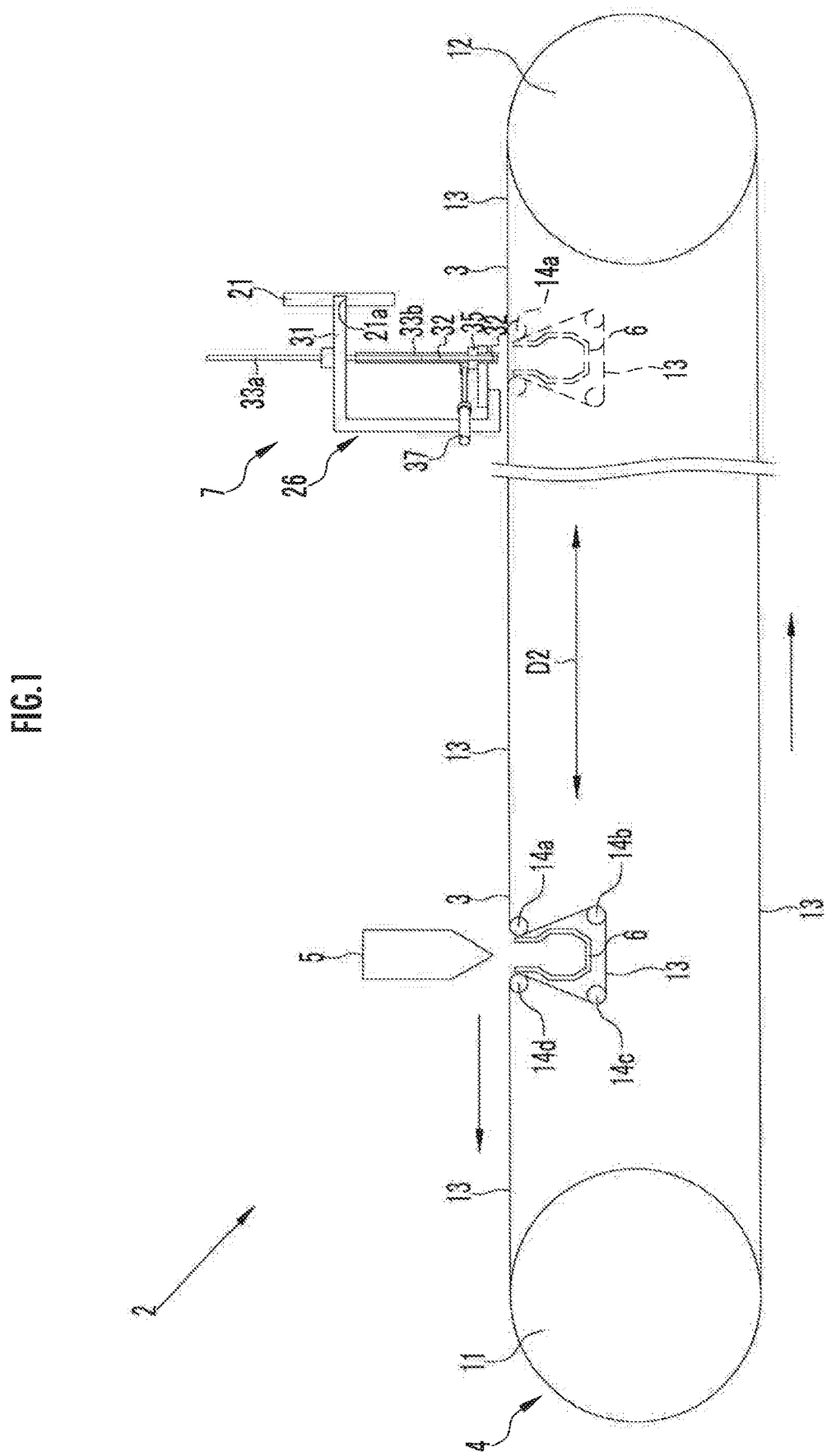

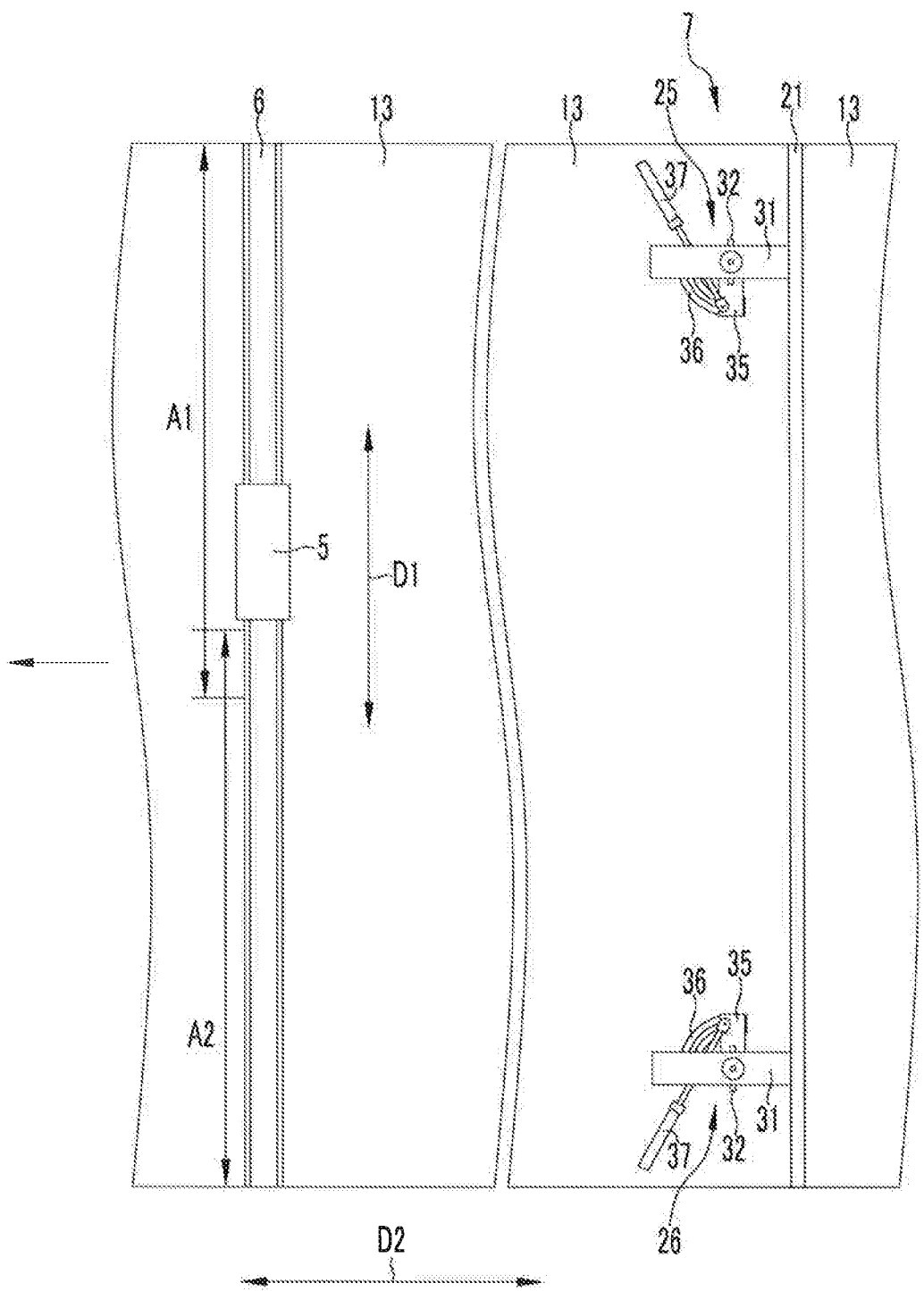

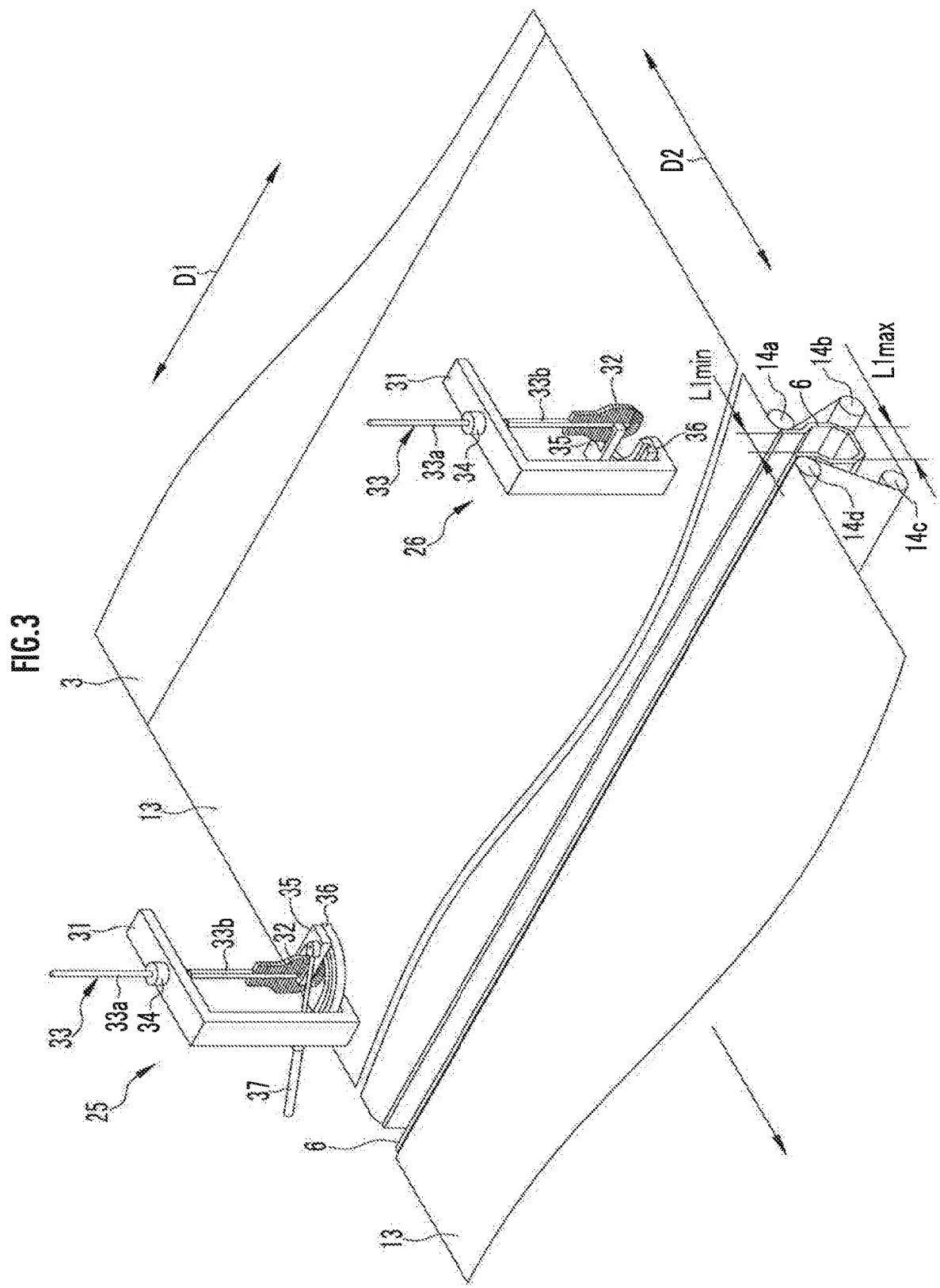

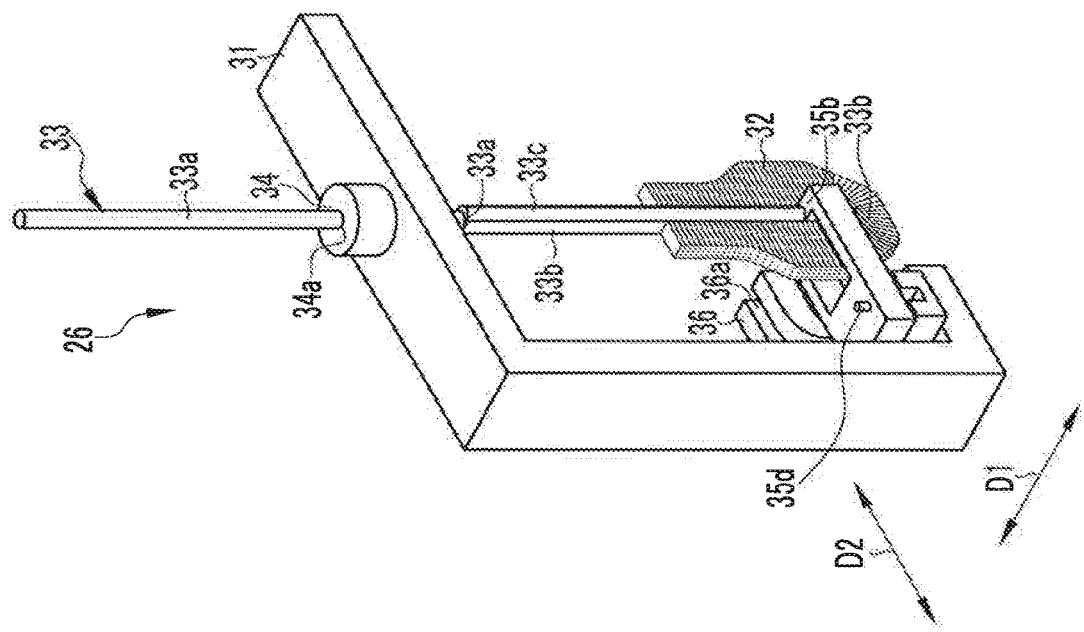
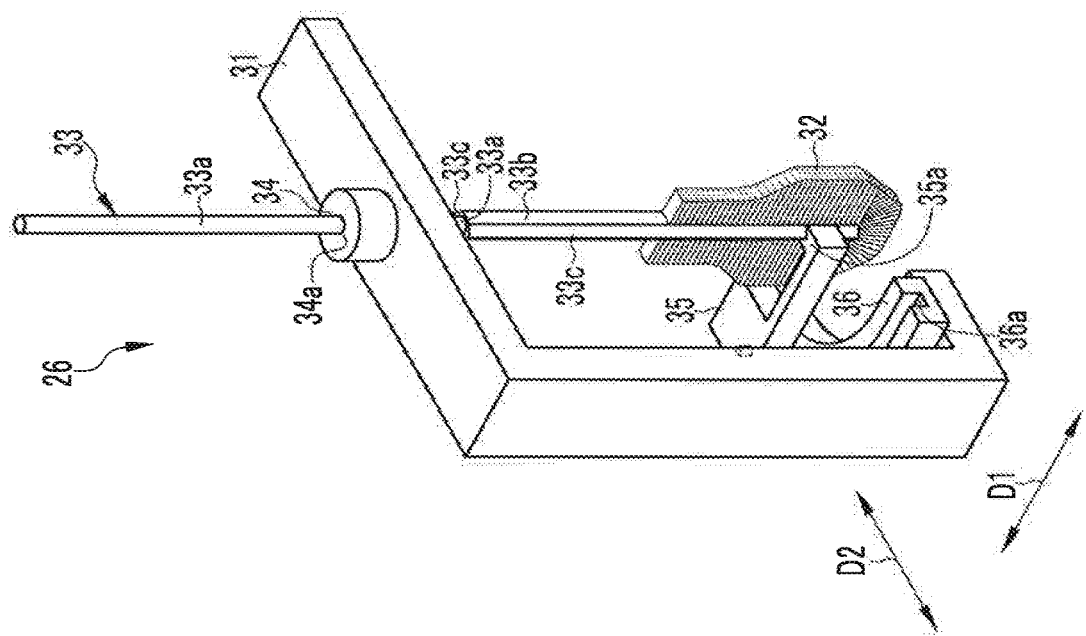

MACHINING SWARF REMOVING APPARATUS

TECHNICAL FIELD

The present invention relates to a machining swarf removing apparatus which removes machining swarf adhered to a recovery box.

BACKGROUND ART

There has been known a laser processing machine which machines a workpiece by laser (for example, Patent Literature 1). According to a combined laser punch machine and a workpiece machining swarf cleaning method disclosed in Patent Literature 1, when a workpiece is machined by laser, machining swarf is generated, and the machining swarf is recovered in a duct; and the machining swarf adhered to an inner wall of the duct is cleaned by a cleaning unit.

According to the combined laser punch machine and the workpiece machining swarf cleaning method disclosed in Patent Literature 1, the cleaning unit comprises a support member and a brush implanted in a support member, and is movably provided. In order to clean the machining swarf adhered to the inner wall of the duct, the brush is inserted into the duct from a side of the duct, and then the cleaning unit is moved.

CITATION LIST

Patent Literature

Patent Literature 1: Japanese Patent Laid-Open No. 2004-209534

SUMMARY OF INVENTION

Technical Problem

However, in Patent Literature 1, the brush is inserted into the duct from a side which is outside in a width direction of the duct, thus increasing the size in the width direction of the device. In addition, when the brush is inserted into the duct, the brush contacts the inner wall of the duct, resulting in that a load is applied to the brush and the brush may be broken.

In view of the above circumstances, the present invention has been made, and an object of the present invention is to provide a machining swarf removing apparatus capable of suppressing an increase in size and preventing the brush from being broken.

Solution to Problem

A machining swarf removing apparatus of the present invention is a machining swarf removing apparatus configured to remove machining swarf by a brush, the machining swarf being generated when a workpiece is machined and being adhered to an inner wall of a recovery box having an opening on an upper surface thereof and extending in a first direction, the machining swarf removing apparatus comprising:

a moving unit configured to move the brush in the first direction;

a lifting and lowering unit configured to lift and lower the brush between a storage position where the brush is stored in the recovery box and a retracted position where the brush is retracted above the recovery box;

a rotating unit configured to rotate the brush about an axial direction of the brush; and a control unit configured to control driving of the moving unit, the lifting and lowering unit, and the rotating unit, wherein the brush is formed such that a length of one side of a plane orthogonal to a lifting and lowering direction is less than a length of another side orthogonal to the one side; the length of the one side is less than an opening width of the recovery box in the first direction and in a second direction orthogonal to the lifting and lowering direction; and the length of the other side is greater than the opening width of the recovery box in the second direction, and the control unit drives the lifting and lowering unit and the rotating unit such that when the brush removes machining swarf, the brush is moved from the retracted position to the storage position in a reference state in which the one side of the brush is oriented in the second direction, and then the brush enters a removal-ready state in which the other side of the brush is oriented in the second direction, and the control unit drives the moving unit such that in the removal-ready state, the brush in the storage position is moved in the first direction.

According to the machining swarf removing apparatus of the present invention, the brush is inserted into the recovery box in a reference state in which the brush does not contact the inner wall of the recovery box, and then the brush enters the removal-ready state in which the brush contacts the inner wall of the recovery box. Therefore, the present invention can eliminate the load applied to the brush when the brush is inserted into the recovery box, thereby preventing the brush from being broken.

Further, the brush is inserted into the recovery box by moving the brush in the lifting and lowering direction. Therefore, the present invention can reduce the size in the width direction of the device more than that of another device where the brush is inserted from a side which is outside in the width direction of the recovery box.

It is preferable that the lifting and lowering unit includes:

a rod configured to have a distal end with the brush attached thereto;

a rod guide configured to movably and rotatably support a rear end of the rod in the lifting and lowering direction;

a support member located closer to the distal end side of the rod than the rod guide, and configured to movably support the rod in the lifting and lowering direction; and a rod moving mechanism configured to move the rod in the lifting and lowering direction, and the rotating unit comprises:

a guide rail extending in an arc shape in a rotation direction of the brush, the guide rail configured to support the support member so as to be rotatable in a direction of the arc shape about an axial direction of the rod; and a rotation mechanism configured to rotate the support member about the axial direction of the rod, wherein in a case where the support member is rotated by the rotation mechanism, the support member supports the rod such that the rod and the support member rotate in a connected state.

According to this configuration, the support member supports the rod so as to movably rotate in a state in which the rod is connected to the support member. Thus, when the rod is moved, the support member does not move. Therefore, this configuration can reduce the size of the device more than that of another device where the support member moves together with the rod when the rod is moved.

Further, it is preferable that the support member includes an opening into which the brush is inserted when the brush is placed in the retracted position.

According to this configuration, in comparison with another device where the brush is not inserted into the support member when the brush is placed in the retracted position, a portion of the rod closer to the brush can be supported by the support member when the brush is placed in the storage position. Therefore, this configuration can suppress the deformation of the rod when machining swarf is removed, thus improving the machining swarf removal performance.

Further, it is preferable to provide a vibrating unit configured to vibrate the brush.

This configuration can vibrate the brush during machining swarf removal and thus can improve the removal performance more than another configuration without the vibrating unit.

Advantageous Effects of Invention

The present invention can suppress an increase in size and prevent the brush from being broken.

BRIEF DESCRIPTION OF DRAWINGS

FIG. 1 is a side view illustrating a laser processing machine.

FIG. 2 is a top view illustrating a main portion of the laser processing machine.

FIG. 3 is a perspective view illustrating a recovery box, a left machining swarf removing unit, a right machining swarf removing unit, and a conveyor belt.

FIG. 5A is a perspective view illustrating the right machining swarf removing unit in an insertion-ready state thereof.

FIG. 5B is a perspective view illustrating the right machining swarf removing unit in a machining swarf removal-ready state thereof.

DESCRIPTION OF EMBODIMENTS

Figure 4B:
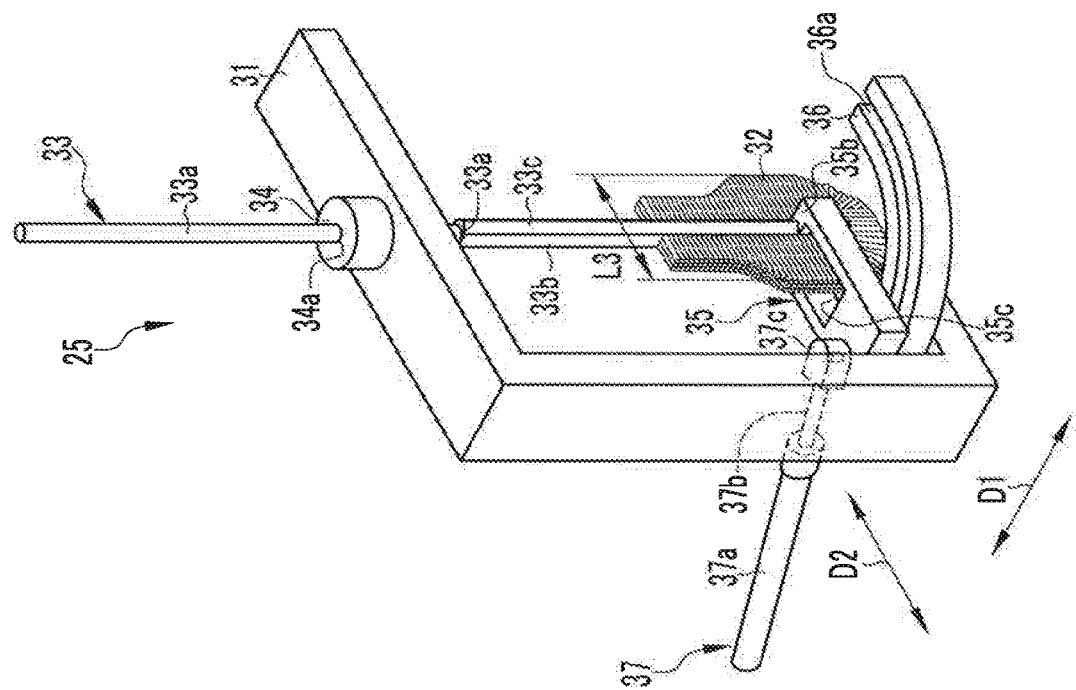
FIG. 4B is a perspective view illustrating the left machining swarf removing unit in a machining swarf removal-ready state thereof.

Hereinafter, an embodiment of the present invention will be described with reference to the accompanying drawings.

As illustrated in FIGS. 1 and 2, a laser processing machine 2 comprises, for example, a conveyor device 4 which conveys a steel plate-shaped workpiece 3; a well-known laser processing device 5 which cuts the workpiece 3 conveyed by the conveyor device 4; a recovery box 6 which recovers machining swarf generated by laser processing by the laser processing device 5; and a machining swarf removing apparatus 7 which removes machining swarf adhered to the recovery box 6.

The conveyor device 4 comprises a drive roller 11, a driven roller 12, and a conveyor belt 13, for example, made of rubber, stretched between the rollers 11 and 12. The conveyor device 4 further comprises first to fourth rollers 14a to 14d which change a conveyor path of the conveyor belt 13 to expose the recovery box 6.

Figure 6:
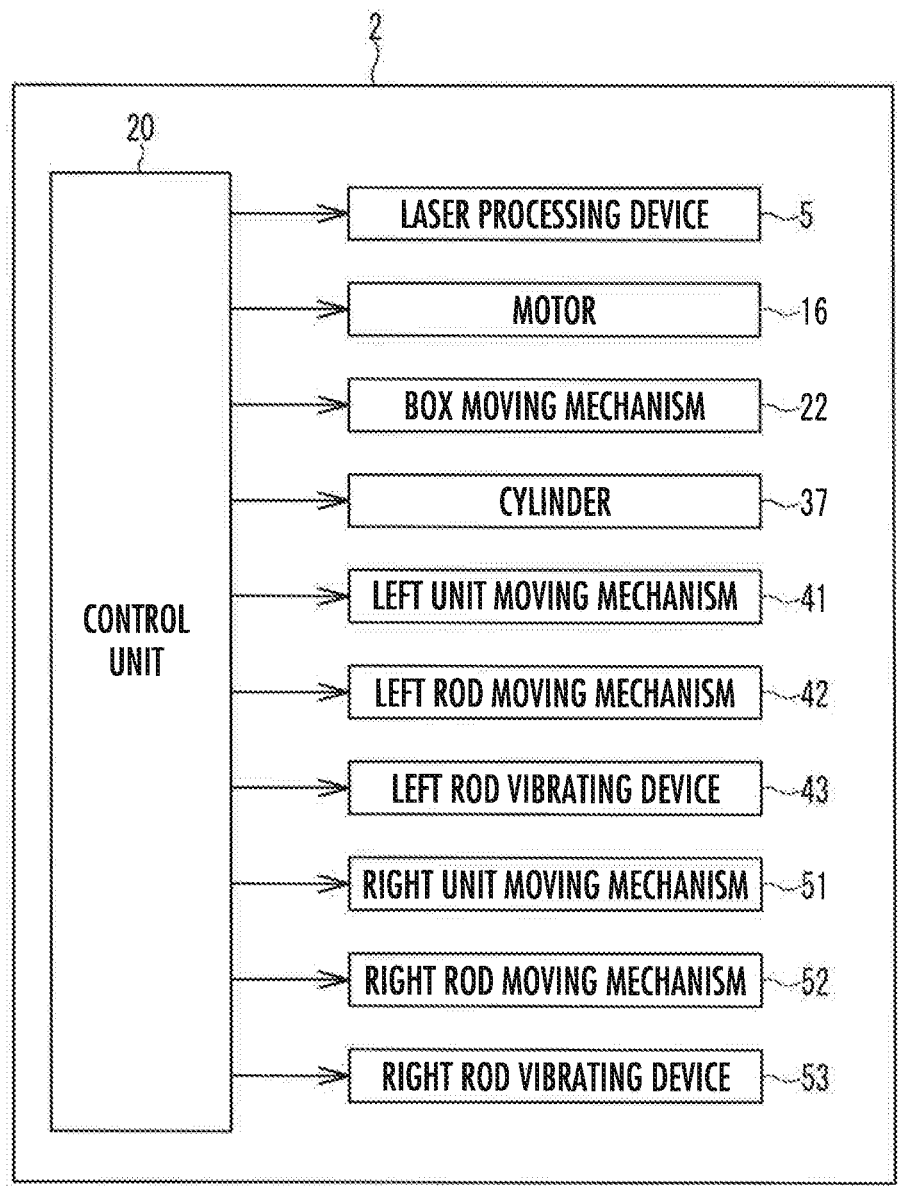
FIG. 6 is a block diagram illustrating a configuration of the laser processing machine.

The drive roller 11 is rotated by a motor 16 (see FIG. 6). The rotation of the drive roller 11 rotates the driven roller 12 and the conveyor belt 13. The motor 16 is controlled to be driven by a control unit 20 (see FIG. 6) which integrally controls the laser processing machine 2.

The laser processing device 5 comprises a laser head (unillustrated) which is movable in a first direction D1 corresponding to the width direction of the conveyor belt 13. The laser processing device 5 is controlled to be driven by the control unit 20 to cut the workpiece 3 by the laser head moving in the first direction D1. The front side portion (left side portion in FIGS. 1 and 2) of the laser processing device 5 includes a guide rail 21 which movably supports a left machining swarf removing unit 25 and a right machining swarf removing unit 26 to be described later in the first direction D1.

The recovery box 6 is formed such that an upper surface thereof is open, an upper side thereof is narrow, and a lower side thereof is wide, and extends in the first direction D1. The recovery box 6 is disposed in a space formed by the first to fourth rollers 14a to 14d, and the upper surface is retracted from the first and fourth rollers 14a and 14d.

The recovery box 6 and the first to fourth rollers 14a to 14d are movably provided in a second direction D2 corresponding to a moving direction of the conveyor belt 13 and moved by a box moving mechanism 22 (see FIG. 6). When the laser processing device 5 cuts the workpiece 3, the control unit 20 drives the box moving mechanism 22 so that the recovery box 6 is placed under the laser head of the laser processing device 5. Note that instead of movably providing the recovery box 6 and the first to fourth rollers 14a to 14d, the laser processing device 5 may be movably provided.

As illustrated in FIGS. 2 and 3, the machining swarf removing apparatus 7 comprises a left machining swarf removing unit 25 and a right machining swarf removing unit 26. As will be described in detail later, the left machining swarf removing unit 25 removes machining swarf in a first area A1 of the recovery box 6, and the right machining swarf removing unit 26 removes machining swarf in a second area A2 of the recovery box 6. The first area A1 is arranged to overlap the second area A2 in the first direction D1. Note that in the present embodiment, the sizes of the left machining swarf removing unit 25 and the right machining swarf removing unit 26 are exaggerated for clarity of illustration. Note also that FIGS. 3, 7, and 10 omit the laser processing device 5 and the guide rail 21.

As illustrated in FIG. 4, the left machining swarf removing unit 25 comprises a substantially U-shaped base 31, a brush 32, a rod 33 attached to an upper portion of the brush 32, and a rod guide 34 which is attached to an upper portion of the base 31 and supports the rod 33 so as to be vertically movable and rotatable. The rod guide 34 includes an insertion hole 34a into which the rod 33 is inserted.

The left machining swarf removing unit 25 further comprises a support plate 35 which vertically movably supports the rod 33, a guide rail 36 which movably supports the support plate 35, and a cylinder 37 which rotates the support plate 35.

The upper portion of the base 31 is inserted into a guide groove 21a (see FIG. 1) extending in the first direction D1 of the guide rail 21. The guide rail 21 movably supports the base 31 in the first direction D1. The left machining swarf removing unit 25 is moved by a left unit moving mechanism 41 (see FIG. 6). The left unit moving mechanism 41 is controlled to be driven by the control unit 20.

The brush 32 includes a plurality of brush bristles, for example, made of nylon. The brush 32 has a shape similar to that of the recovery box 6 and is formed to be slightly greater than the recovery box 6. The brush 32 is formed in a rectangular shape in top view. The length L2 (of one side) in the transverse direction is smaller than a minimum opening width L1min (see FIG. 3) of the recovery box 6 in the second direction D2; and the length L3 (of the other side) in the longitudinal direction is greater than a maximum opening width L1max of the recovery box 6. Note that in FIG. 4, the thickness of the brush bristles is exaggerated for clarity of illustration.

The rod 33 includes a circular upper rod portion 33a and a hexagonal lower rod portion 33b. The brush 32 is attached to a lower portion of the lower rod portion 33b. The brush bristles of the brush 32 are fixed to the two sides facing the lower rod portion 33b. The brush 32 is not attached to a triangular protruding portion 33c protruding in a triangular shape of the lower rod portion 33b. The lower rod portion 33b includes two triangular protruding portions 33c which are formed to face each other. As will be described in detail later, the two triangular protruding portions 33c are supported by the support plate 35.

The rod 33 is vertically movably provided and formed such that when moved within a movement range, the upper rod portion 33a is movably supported by the rod guide 34 and the lower rod portion 33b is movably supported by the support plate 35. The rod 33 is vertically moved by a left rod moving mechanism 42 (see FIG. 6). The left rod moving mechanism 42 is controlled to be driven by the control unit 20.

The support plate 35 comprises a first arm portion 35a and a second arm portion 35b which support the lower rod portion 33b. The first arm portion 35a and the second arm portion 35b each have a distal end portion formed in a concave shape which is the same shape as that of the triangular protruding portion 33c of the lower rod portion 33b. The first arm portion 35a contacts one of the two triangular protruding portions 33c of the lower rod portion 33b, and the second arm portion 35b contacts the other of the triangular protruding portions 33c. Thus, the rod 33 is vertically movably supported to the support plate 35, allowing the rod 33 and the support plate 35 to be rotated in an integrally connected state.

An opening portion 35c is formed between the first arm portion 35a and the second arm portion 35b. The brush 32 can be inserted into the opening portion 35c. As illustrated in FIG. 4, when the brush 32 is in a retracted position extracted from the recovery box 6, the brush 32 is in a state in which the opening portion 35c is inserted.

An upper protruding portion 35d for engaging with the cylinder 37 is formed on an upper surface of the support plate 35. In addition, a lower protruding portion 35e which is inserted into a later described guide groove 36a of the guide rail 36 is formed on a lower surface of the support plate 35.

The guide rail 36 is formed in an arc shape and is attached to the base 31. The guide rail 36 includes an arc-shaped guide groove 36a into which the lower protruding portion 35e of the support plate 35 is inserted. When the lower protruding portion 35e of the support plate 35 is moved along the guide groove 36a, the support plate 35 is rotated about the rod 33 together with the rod 33.

Figure 4A:
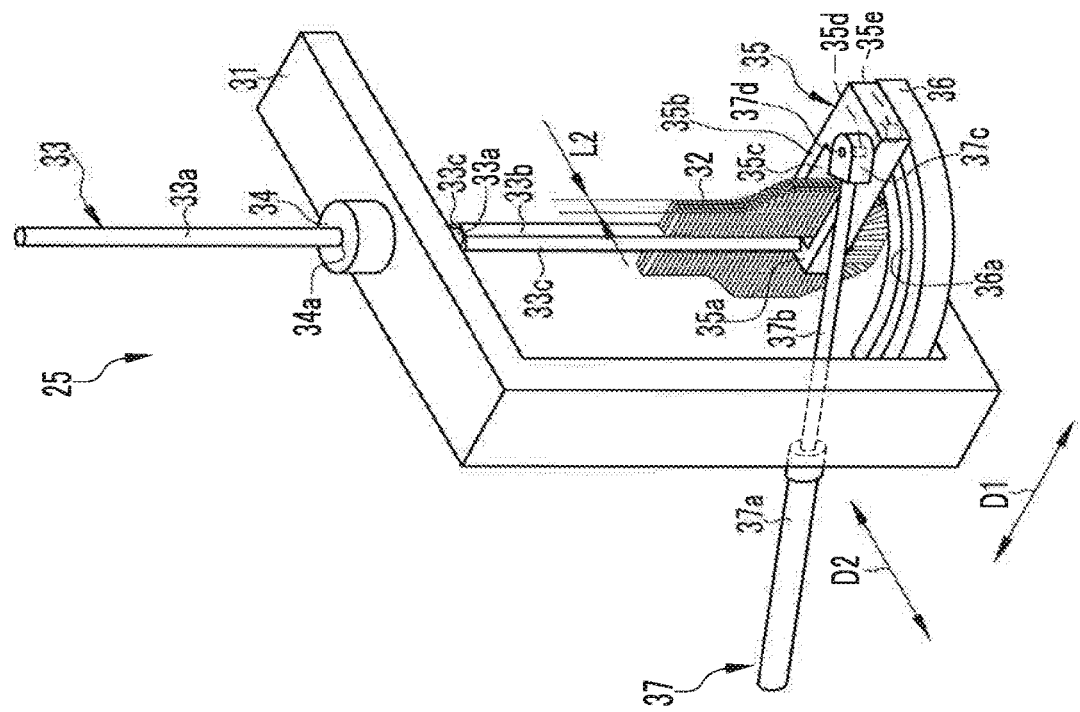
FIG. 4A is a perspective view illustrating the left machining swarf removing unit in an insertion-ready state thereof.

The rotation of the rod 33 also rotates the brush 32 attached to the rod 33 between an insertion-ready state (reference state) in which the transverse direction is oriented in the second direction D2 as illustrated in FIG. 4A and a machining swarf removal-ready state in which the longitudinal direction is oriented in the second direction D2 as illustrated in FIG. 4B.

The cylinder 37 comprises a main body portion 37a, a piston 37b which is movably supported to the main body portion 37a, and an engaging portion 37c which is attached to the distal end portion of the piston 37b. The main body portion 37a is supported by the support member (unillustrated).

The engaging portion 37c includes an insertion hole 37d into which the upper protruding portion 35d of the support plate 35 is inserted. The upper protruding portion 35d is inserted into the insertion hole 37d, and the support plate 35 is engaged with the engaging portion 37c. The cylinder 37 is controlled to be driven by the control unit 20. The movement of the piston 37b causes the support plate 35 to be rotated about the rod 33 together with the rod 33.

In addition, the left machining swarf removing unit 25 includes a left rod vibrating device 43 (see FIG. 6) which vibrates the rod 33. The left rod vibrating device 43 includes a disc (unillustrated), for example, having an eccentric rotation axis, and is controlled to be driven by the control unit 20.

As illustrated in FIG. 5, like the left machining swarf removing unit 25, the right machining swarf removing unit 26 comprises the base 31, the brush 32, the rod 33, the rod guide 34, the support plate 35, the guide rail 36, and the cylinder 37. The right machining swarf removing unit 26 is provided so as to be bilaterally symmetrical with the left machining swarf removing unit 25. Note that FIGS. 5 and 7 omit the cylinder 37. Note also that FIG. 5 simplifies the brush 32 for clarity of illustration.

The base 31 of the right machining swarf removing unit 26 is configured such that an upper portion thereof is inserted into the guide groove 21a of the guide rail 21 and is movably supported in the first direction D1 by the guide rail 21. The right machining swarf removing unit 26 is moved by a right unit moving mechanism 51 (see FIG. 6). The right unit moving mechanism 51 is controlled to be driven by the control unit 20.

The rod 33 of the right machining swarf removing unit 26 is vertically moved by a right rod moving mechanism 52 (see FIG. 6). The right rod moving mechanism 52 is controlled to be driven by the control unit 20.

The right machining swarf removing unit 26 is configured such that the rotation of the rod 33 causes the brush 32 attached to the rod 33 to be rotated between the insertion-ready state as illustrated in FIG. 5A and the machining swarf removal-ready state as illustrated in FIG. 5B.

In addition, the right machining swarf removing unit 26 includes a right rod vibrating device 53 (see FIG. 6) which vibrates the rod 33. The right rod vibrating device 53 includes a disc (unillustrated), for example, having an eccentric rotation axis, and is controlled to be driven by the control unit 20. Note that the left rod vibrating device 43 and the right rod vibrating device 53 may be omitted.

When the workpiece 3 is cut by the laser processing device 5, the control unit 20 drives the box moving mechanism 22 so that the recovery box 6 is placed under the laser head of the laser processing device 5 (see FIG. 1). Then, the laser head of the laser processing device 5 is driven to cut the workpiece 3. The cut workpiece 3 is conveyed by the conveyor device 4 and is placed on a pallet (unillustrated).

The workpiece 3 is cut above the recovery box 6, and thus the machining swarf generated by cutting is recovered in the recovery box 6. The machining swarf recovered in the recovery box 6 is adhered to the inner wall or the upper surface of the recovery box 6. If a large amount of machining swarf is accumulated, the machining swarf cannot be recovered and may be adhered to the workpiece 3. For this reason, the control unit 20 periodically performs machining swarf removal control to remove the machining swarf adhered to the recovery box 6 by the machining swarf removing apparatus 7.

Figure 7:
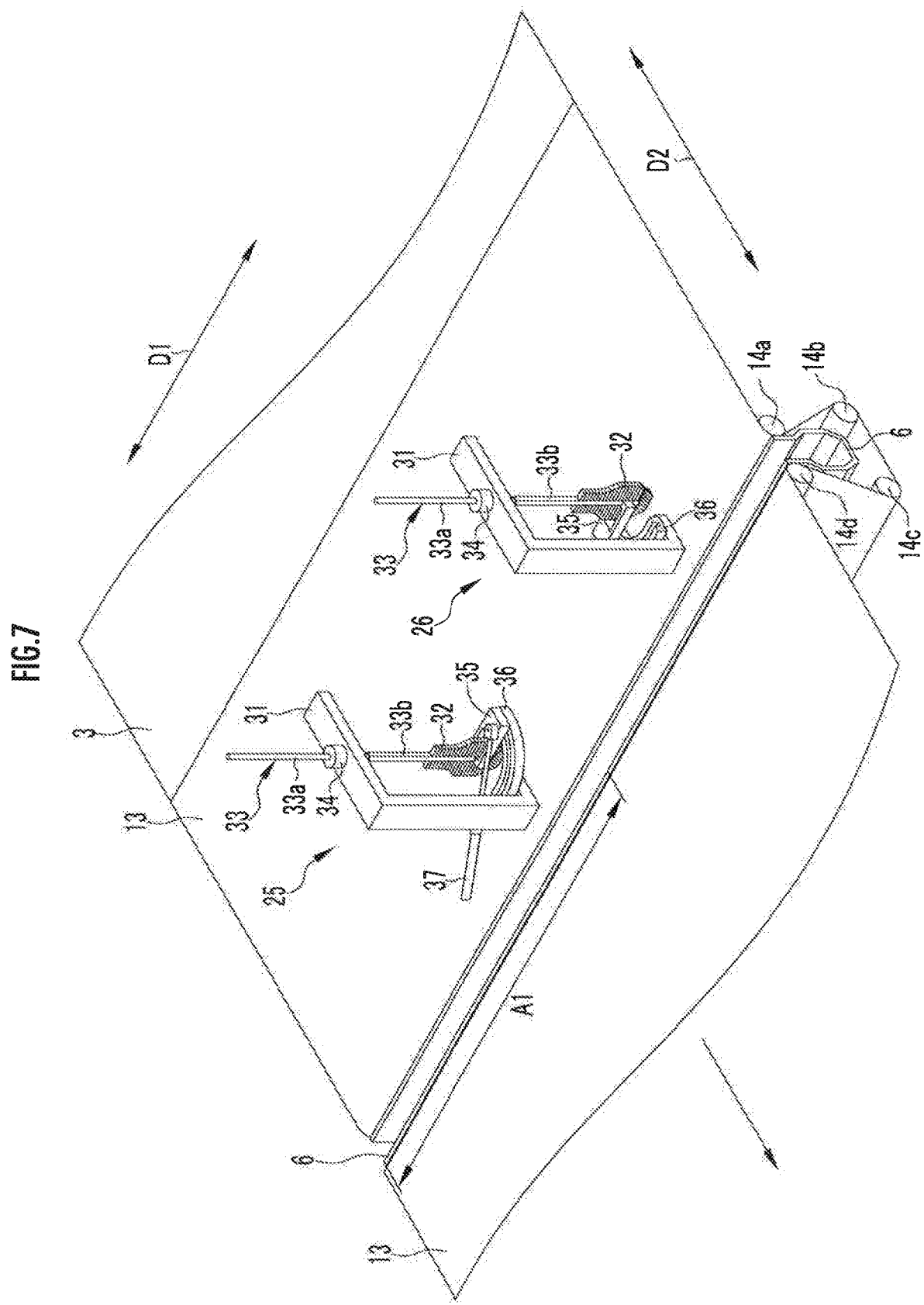
FIG. 7 is a perspective view illustrating a state in which the left machining swarf removing unit is moved to a removal starting position.
Figure 8:
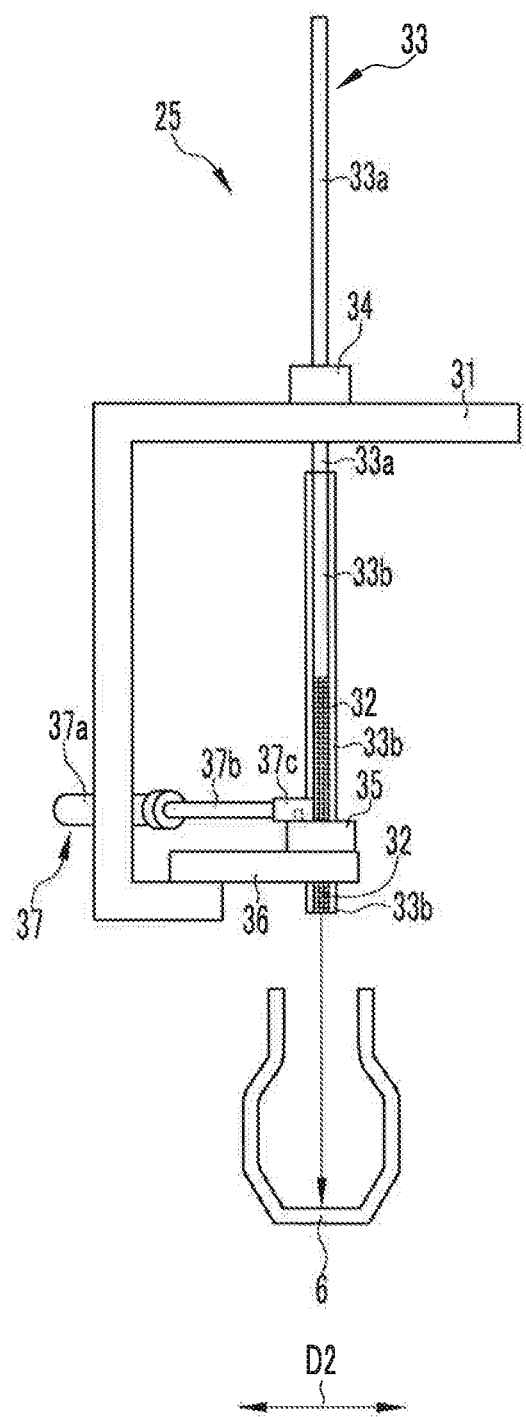
FIG. 8 is a side view illustrating the recovery box and the left machining swarf removing unit before the brush is inserted into the recovery box.

When the machining swarf adhered to the recovery box 6 is removed by the machining swarf removing apparatus 7, as illustrated in FIGS. 7 and 8, the control unit 20 drives the box moving mechanism 22 to move the recovery box 6 and each of the rollers 14a to 14d so that the left machining swarf removing unit 25 and the right machining swarf removing unit 26 are placed right above the recovery box 6. Further, the control unit 20 drives the left unit moving mechanism 41 so that the left machining swarf removing unit 25 is placed in the removal starting position (right end in FIG. 7) of the first area A1.

As illustrated in FIG. 8, when the left machining swarf removing unit 25 is placed right above the recovery box 6, the brush 32 is in the insertion-ready state in which the transverse direction is oriented in the second direction D2.

Figure 9A:
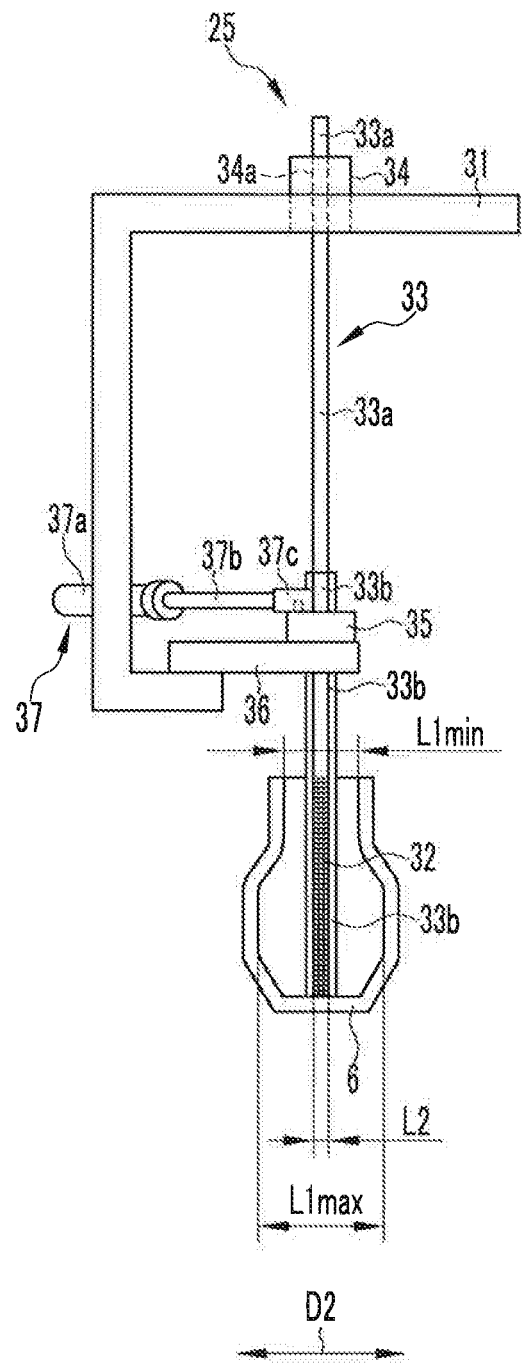
FIG. 9A is a side view illustrating the left machining swarf removing unit and the recovery box in which the brush in an insertion-ready state is inserted into the recovery box.

As illustrated in FIG. 9A, the control unit 20 drives the left rod moving mechanism 42 so as to move the brush 32 to the insertion position for insertion into the recovery box 6. Since the length L2 in the transverse direction is smaller than the minimum opening width L1*min* of the recovery box 6, the brush 32 is inserted into the recovery box 6 without contacting the inner wall of the recovery box 6.

In the state illustrated in FIG. 9A, the hexagonal lower rod portion 33b of the rod 33 is supported by the first arm portion 35a and the second arm portion 35b of the support plate 35. Thus, when the cylinder 37 is driven to rotate the support plate 35, the rod 33 and the support plate 35 rotate in an integrally connected state. Therefore, the support plate 35 can reliably rotate the rod 33 during rotation. In addition, the support plate 35 does not move while the rod 33 is moved, thus allowing the size of the device to be smaller than that of another device where the support plate 35 moves together with the rod 33.

Figure 9B:
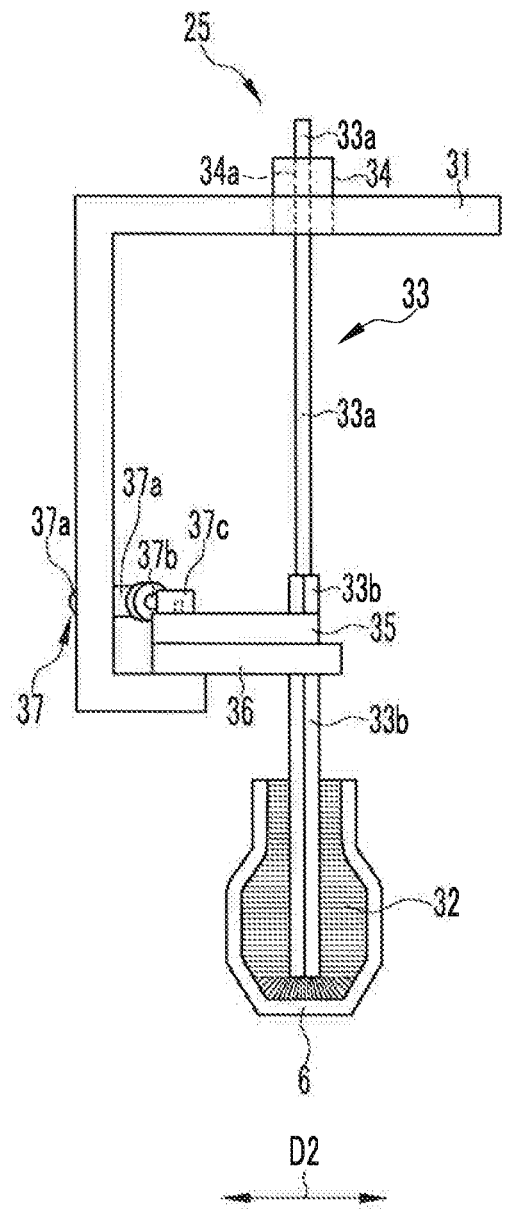
FIG. 9B is a side view illustrating the left machining swarf removing unit and the recovery box in which the brush in a machining swarf removal-ready state is inserted into the recovery box.

Then, as illustrated in FIG. 9B, the control unit 20 drives the cylinder 37 so that the brush 32 enters the machining swarf removal-ready state in which the longitudinal direction is oriented in the second direction D2. When the cylinder 37 is driven to rotate the support plate 35, the rod 33 rotates together with the support plate 35, and the brush 32 enters the machining swarf removal-ready state.

Since the length L3 (see FIG. 4B) in the longitudinal direction is greater than the maximum opening width L1*max* of the recovery box 6, the brush 32 presses the inner wall of the recovery box 6 in the machining swarf removal-ready state. In this state, the control unit 20 drives the left unit moving mechanism 41 so as to move the left machining swarf removing unit 25 to a removal end position (left end in FIG. 7) of the first area A1.

In addition, when the left machining swarf removing unit 25 is moved, the control unit 20 drives the left rod vibrating device 43 to vibrate the rod 33 and to vibrate the brush 32 attached to the rod 33.

When the left machining swarf removing unit 25 moves toward the removal end position of the first area A1, the machining swarf adhered to the inner wall of the recovery box 6 is swept up by the brush 32 and is recovered in a dust box (unillustrated).

After the removal by the left machining swarf removing unit 25 ends, the control unit 20 drives the cylinder 37 of the left machining swarf removing unit 25 so that the brush 32 of the left machining swarf removing unit 25 enters the insertion-ready state (see FIG. 9A) in which the transverse direction is oriented in the second direction D2. Then, the control unit 20 drives the left rod moving mechanism 42 so as to move the brush 32 of the left machining swarf removing unit 25 to the retracted position extracted from the recovery box 6 (see FIG. 8).

Figure 10:
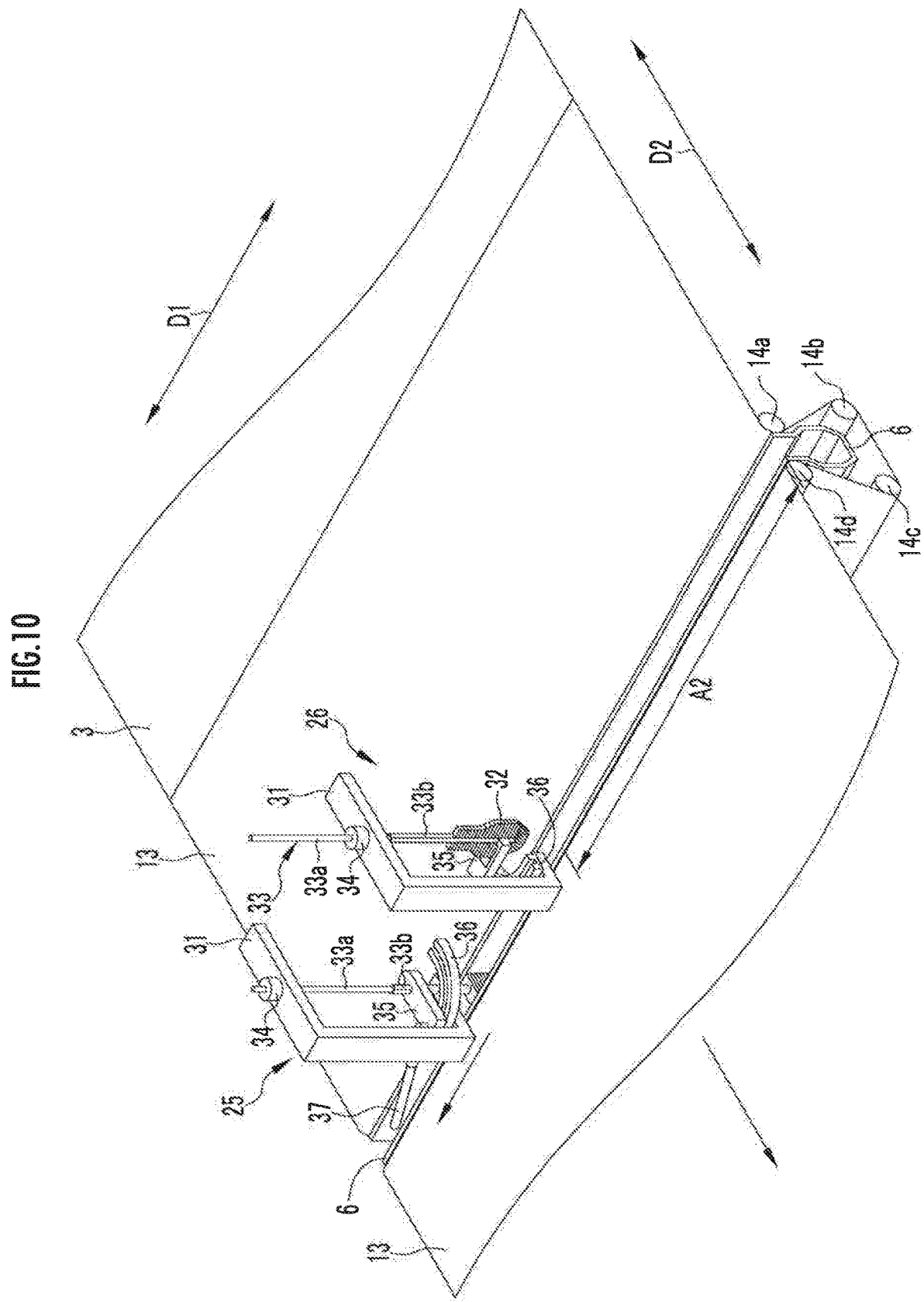
FIG. 10 is a perspective view illustrating a state in which the right machining swarf removing unit is moved to a removal starting position during removal by the left machining swarf removing unit.

In addition, as illustrated in FIG. 10, the control unit 20 drives the right unit moving mechanism 51 so that the right machining swarf removing unit 26 is placed in the removal starting position (left end in FIG. 10) of the second area A2 during the removal by the left machining swarf removing unit 25.

In the same manner as the left machining swarf removing unit 25, during the removal by the left machining swarf removing unit 25, the control unit 20 drives the right rod moving mechanism 52 to move the brush 32 of the right machining swarf removing unit 26 to the insertion position in the insertion-ready state in which the transverse direction is oriented in the second direction D2. Then, the control unit 20 drives the cylinder 37 of the right machining swarf removing unit 26 so that the brush 32 of the right machining swarf removing unit 26 enters the machining swarf removal-ready state in which the longitudinal direction is oriented in the second direction D2.

Then, the control unit 20 drives the right unit moving mechanism 51 to move the right machining swarf removing unit 26 to the removal end position (right end in FIG. 10) of the second area A2. In addition, when the right machining swarf removing unit 26 is moved, the control unit 20 drives the right rod vibrating device 53 to vibrate the rod 33 and to vibrate the brush 32 attached to the rod 33.

When the right machining swarf removing unit 26 moves toward the removal end position of the second area A2, the machining swarf adhered to the inner wall of the recovery box 6 is swept up by the brush 32 of the right machining swarf removing unit 26 and is recovered in a dust box (unillustrated).

After the removal by the right machining swarf removing unit 26 ends, the control unit 20 drives the cylinder 37 of the right machining swarf removing unit 26 so that the brush 32 of the right machining swarf removing unit 26 enters the insertion-ready state in which the transverse direction is oriented in the second direction D2. Then, the control unit 20 drives the right rod moving mechanism 52 so as to move the brush 32 of the right machining swarf removing unit 26 to the retracted position extracted from the recovery box 6. The above described machining swarf removal control removes the machining swarf adhered to the recovery box 6.

In the present embodiment, in the state in which the brush 32 presses the inner wall of the recovery box 6, the brush 32 is moved to sweep up the machining swarf adhered to the inner wall of the recovery box 6. Thus, the present embodiment can more reliably remove the machining swarf than another embodiment of sweeping up without pressing.

In addition, during machining swarf removal by the brush 32, the brush 32 is vibrated by the left rod vibrating device 43 and the right rod vibrating device 53. Thus, the present embodiment can improve removal performance more than another embodiment without vibrating the brush 32.

In the present embodiment, when the brush 32 is inserted into the recovery box 6, the brush 32 is inserted in the insertion-ready state in which the transverse direction is oriented in the second direction D2. Thus, the brush 32 can be inserted without contacting the inner wall of the recovery box 6. Therefore, when the brush is inserted, a load is not applied to the brush 32 or the rod 33, thereby preventing the brush from being broken by a load. Further, when the brush is inserted, the brush 32 is prevented from contacting the inner wall or the upper surface of the recovery box 6 and scattering the machining swarf.

In addition, when the brush 32 is in the retracted position (see FIGS. 4 and 8), the brush 32 is inserted into the opening portion 35c of the support plate 35. Thus, in comparison with an embodiment in which when the brush 32 is in the insertion position (see FIG. 9), the brush 32 is not inserted into the support plate 35, a portion of the lower rod portion 33b near the brush 32 can be supported by the support plate 35. This can suppress the deformation of the rod 33 when machining swarf is removed, thus improving the machining swarf removal performance.

In the present embodiment, the left machining swarf removing unit 25 and the right machining swarf removing unit 26 are vertically movably provided, and thus the machining swarf removal range of the recovery box 6 can be divided for each of the units 25 and 26.

In addition, the removal by the right machining swarf removing unit 26 starts during the removal by the left machining swarf removing unit 25. This embodiment can reduce the machining swarf removal-related time more than another embodiment in which the removal by the right machining swarf removing unit 26 starts after the removal by the left machining swarf removing unit 25 ends.

Figure 11:
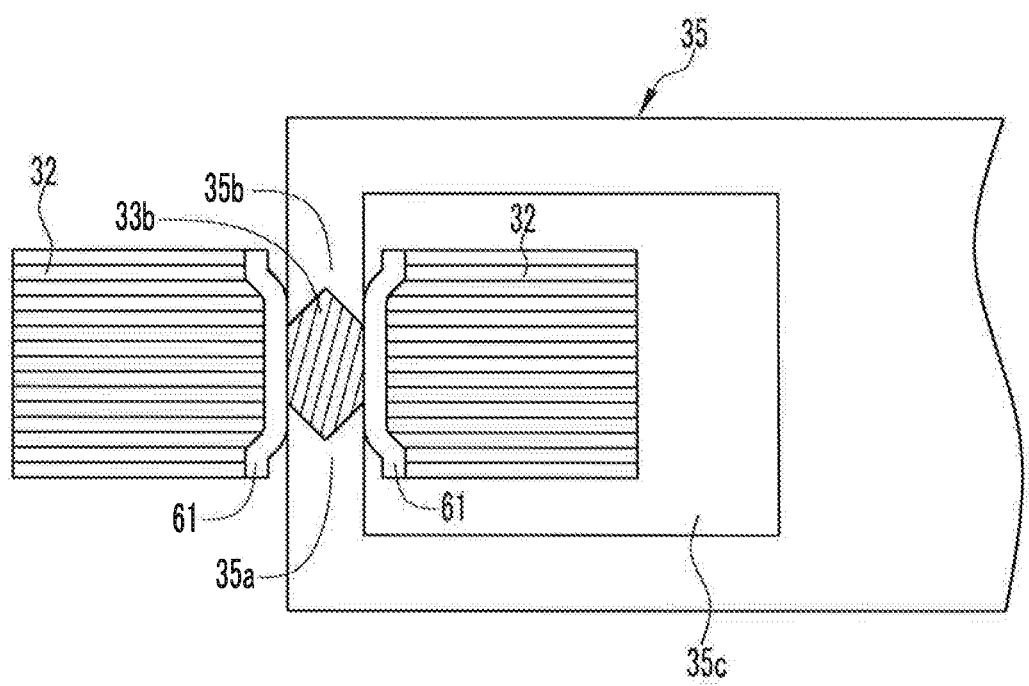
FIG. 11 is a top view illustrating the brush in an embodiment in which the brush is attached to a lower rod portion of the rod with an attachment plate therebetween.

In the above embodiment, the brush 32 is attached to the lower rod portion 33b of the rod 33, but as illustrated in FIG. 11, another embodiment may be configured such that an attachment plate 61 is fixed to the lower rod portion 33b and the brush 32 may be attached to the attachment plate 61. In this case, the thickness (vertical length in FIG. 11) of the brush 32 can be increased more than the above embodiment in which the brush 32 is attached to the lower rod portion 33b.

As long as during the removal by the left machining swarf removing unit 25, the timing of starting the removal by the right machining swarf removing unit 26 may be appropriately changed. Note that the removal by the right machining swarf removing unit 26 may start after the removal by the left machining swarf removing unit 25 ends. Note also that the removal by the right machining swarf removing unit 26 may start before the removal by the left machining swarf removing unit 25.

In addition, only one of the left machining swarf removing unit 25 and the right machining swarf removing unit 26 may be provided. In this case, machining swarf removal is performed in the entire range of the recovery box 6 by one of the left machining swarf removing unit 25 and the right machining swarf removing unit 26.

In the above embodiment, the cross section of the brush 32 is formed in a rectangular shape, but the cross section thereof is not limited to a rectangular shape but may be an elliptical shape.

In the above embodiment, each of the machining swarf removal by the left machining swarf removing unit 25 and the machining swarf removal by the right machining swarf removing unit 26 is performed once but may be performed a plurality of times.

In the above embodiment, the lower rod portion 33b of the rod 33 is formed in a hexagonal shape having two triangular protruding portions 33c and the front concave portion of the first arm portion 35a and the second arm portion 35b supporting the lower rod portion 33b is formed in the same triangular shape as the triangular protruding portion 33c, thereby allowing the rod 33 and the support plate 35 to rotate in an integrally connected state. However, it is sufficient that the rod 33 and the support plate 35 rotate in an integrally connected state, and the shape of the lower rod portion 33b may be appropriately changed with the exception of a perfect circle, and, for example, may be a quadrilateral shape, an elliptical shape, or the like.

Note that the mechanism for moving the brush 32 and the mechanism for rotating the brush 32 are not limited to the mechanisms of the above embodiment but may be changed as appropriate.

REFERENCE SIGNS LIST 2 laser processing machine
3 workpiece
4 conveyor device
5 laser processing device
6 recovery box
7 machining swarf removing apparatus
11 drive roller
12 driven roller
13 conveyor belt 13
14a to 14d first to fourth rollers
16 motor
20 control unit
21 guide rail
21a guide groove
22 box moving mechanism
25 left machining swarf removing unit
26 right machining swarf removing unit
31 base
32 brush
33 rod
33a upper rod portion
33b lower rod portion
34 rod guide
34a insertion hole
35 support plate (support member)
35a first arm portion
35b second arm portion
35c opening portion
36 guide rail 36
36a guide groove
37 cylinder
41 left unit moving mechanism
42 left rod moving mechanism
43 left rod vibrating device
51 right unit moving mechanism
52 right rod moving mechanism
53 right rod vibrating device

The invention claimed is:

1. A machining swarf removing apparatus configured to remove machining swarf by a brush, the machining swarf being generated when a workpiece is machined and being adhered to an inner wall of a recovery box having an opening on an upper surface thereof and extending in a first direction, the recovery box opening having an upper width and a lower width, the upper width being less than a lower width, the machining swarf removing apparatus comprising:

a pivoting brush pivotable about an axial direction parallel to a lifting and lowering direction of the brush, wherein movement in the lifting and lowering direction lifts and lowers the brush between a storage position where the brush is stored in the recovery box and a retracted position where the brush is retracted above the recovery box; and a rotating unit configured to pivot the brush about an axial direction parallel to a lifting and lowering direction of the brush;

wherein the brush is formed such that a width of the brush orthogonal to a lifting and lowering direction is less than a length of the brush parallel to the lifting and lowering direction;

the width of the brush is less than the upper width of the recovery box opening;

and the length of the brush is greater than the lower width of the recovery box opening; and wherein when the brush removes machining swarf, the brush moves from the retracted position to the storage position in a reference state in which the width of the brush is oriented in a second direction orthogonal to the first direction, and then the brush enters a removal-ready state in which the length of the brush is oriented in the second direction; and in the removal-ready state, the brush in the storage position moves in the first direction.

2. The machining swarf removing apparatus according to claim 1, further comprising:

a rod having a proximal end, and a distal end with the brush attached thereto;

a rod guide attached to a base, the rod guide supporting the proximal end of the rod for the rod to be vertically movable and rotatable;

a support member located at a position closer to the distal end side of the rod than the rod guide and which contacts and vertically movably supports the rod when moved in the lifting and lowering direction; and the rotating unit comprising: a guide rail extending in an arc shape in a rotation direction of the brush, the guide rail movably supporting the support member to pivot in a direction of the arc shape about a vertical axis parallel to a lifting and lowering direction of the rod;

a cylinder which pivots the support member about the axial direction of the rod, wherein when the support member is rotated by the rotation mechanism, the support member supports the rod such that the rod and the support member rotate in a connected state.

3. The machining swarf removing apparatus according to claim 2, wherein the support member includes an opening into which the brush is inserted when the brush is placed in the retracted position.

* * * * *